(12) United States Patent
Ho et al.

(10) Patent No.: US 11,150,434 B2
(45) Date of Patent: Oct. 19, 2021

(54) LENS BREECH LOCKING DEVICE

(71) Applicant: GLOBAL BOOM INTERNATIONAL LIMITED, Kowloon (HK)

(72) Inventors: Peter Chung Man Ho, Kowloon (HK); Wilfried Bitter, Tsing Yi (HK)

(73) Assignee: GLOBAL BOOM INTERNATIONAL LIMITED, Kowloon (HK)

( * ) Notice: Subject to any disclaimer, the term of this patent is extended or adjusted under 35 U.S.C. 154(b) by 84 days.

(21) Appl. No.: 16/659,492

(22) Filed: Oct. 21, 2019

(65) Prior Publication Data

US 2021/0116669 A1    Apr. 22, 2021

(51) Int. Cl.
*G02B 7/02*    (2021.01)
*G03B 17/12*   (2021.01)

(52) U.S. Cl.
CPC ............. *G02B 7/022* (2013.01); *G03B 17/12* (2013.01)

(58) Field of Classification Search
CPC ................................ G02B 7/022; G03B 17/12

USPC ........................................................ 359/819
See application file for complete search history.

(56) References Cited

U.S. PATENT DOCUMENTS

2018/0364441 A1 * 12/2018 Hubert ............... H04N 5/23287

* cited by examiner

*Primary Examiner* — James C. Jones
(74) *Attorney, Agent, or Firm* — Intellectual Property Law Group LLP

(57) ABSTRACT

The present application provides a lens breech locking device, which relates to a structure for locking a lens. It comprises a lens (1) and an adapter (2), a lens placement slot (3) for placing the lens (1) is arranged on the adapter (2), wherein, a plurality of vertical fork flanges (5) with claws (4) are mounted in the lens placement slot (3) for adjusting the position of the lens (1) on the adapter (2), the claw (4) is located between a chassis (13) of the vertical fork flange (5) and the bottom of the lens placement slot (3). The present application adds four vertical fork flanges to the lens placement slot of the adapter/camera, and limits the lens through the vertical fork flange, so that the lens can be better locked on the adapter.

8 Claims, 3 Drawing Sheets

LENS BREECH LOCKING DEVICE

BACKGROUND OF THE INVENTION

1. Field of the Invention

The present application relates to a structure for locking a lens, and specially relates to a lens breech locking device.

2. Background

At present, when people need to install lens breech lock of the camera, the existing technology is to lock the camera lens on the adapter/camera using a card mounting seat. When a camera lens is mounted with a card mounting seat, there may be some gap between the lens and the adapter/camera after a long period of use due to friction between the contact surface of the lens and the adapter, which will make the structure for mounting and locking the lens on the card mounting seat thinner, thus making the lens unable to focus and provide a clear image for the camera sensor, so it is necessary to improve it.

SUMMARY OF THE INVENTION

The purpose of the present application is to solve the above technical problems and propose a lens breech locking device.

In order to achieve the above object, the technical solution of the present application is: a lens breech locking device, comprising a lens and an adapter, a lens placement slot for placing the lens arranged on the adapter, wherein, a plurality of vertical fork flanges with claws are mounted in the lens placement slot for adjusting the position of the lens on the adapter, claw is located between a chassis of the vertical fork flange and the bottom of the lens placement slot.

In the above technical solution, there are four vertical fork flanges, and the four vertical fork flanges are evenly spaced, and the four vertical fork flanges are circularly arranged as a whole.

In the above technical solution, the lens placement slot is also provided with a friction locking ring under the claw, an adapter bracket for locking the adapter is connected with the middle of the friction locking ring, and a lens positioning hole for placing the lens is arranged in the middle of the adapter bracket.

In the above technical solution, the adapter bracket is also provided with a plurality of lens positioning holes and bolt mounting holes.

In the above technical solution, the top of the lens is also provided with a bottom plate mounted on the chassis of the vertical fork flange.

The present application provides four vertical fork flanges in the lens placement slot of the adapter/camera, and limits the lens through the vertical fork flange, so that the lens can be better locked on the adapter.

At the same time, when the adapter bracket (camera/camera bracket) is locked in the proper position in the lens placement slot by using friction locking ring, the bottom plate of the lens can be directly placed on the vertical flange, and the appropriate distance between the lens and the adapter can be maintained.

BRIEF DESCRIPTION OF THE DRAWINGS

The present application will be further described below in conjunction with the accompanying drawings and embodiments, in which.

DETAILED DESCRIPTION OF SPECIFIC EMBODIMENTS

The technical problem to be solved by the present application is: the existing technology is to lock the camera lens on the adapter/camera using a card mounting seat, there may be some gap between the lens and the adapter/camera after a long period of use due to friction between the contact surface of the lens and the adapter, which will make the structure for mounting and locking the lens on the card mounting seat thinner, thus making the lens unable to focus and provide a clear image for the camera sensor. In view of the above technical problems, the technical idea of the present application is that the vertical fork flange is arranged in the lens placement slot, and the lens is limited by the vertical fork flange, thereby realizing the locking of the lens.

In order to make the technical purpose, technical scheme and technical effect of the present application clearer so that the technical personnel in the field can understand and implement the present application, the following will give a further detailed description of the present application in conjunction with the drawings and specific embodiments.

Figure 3:
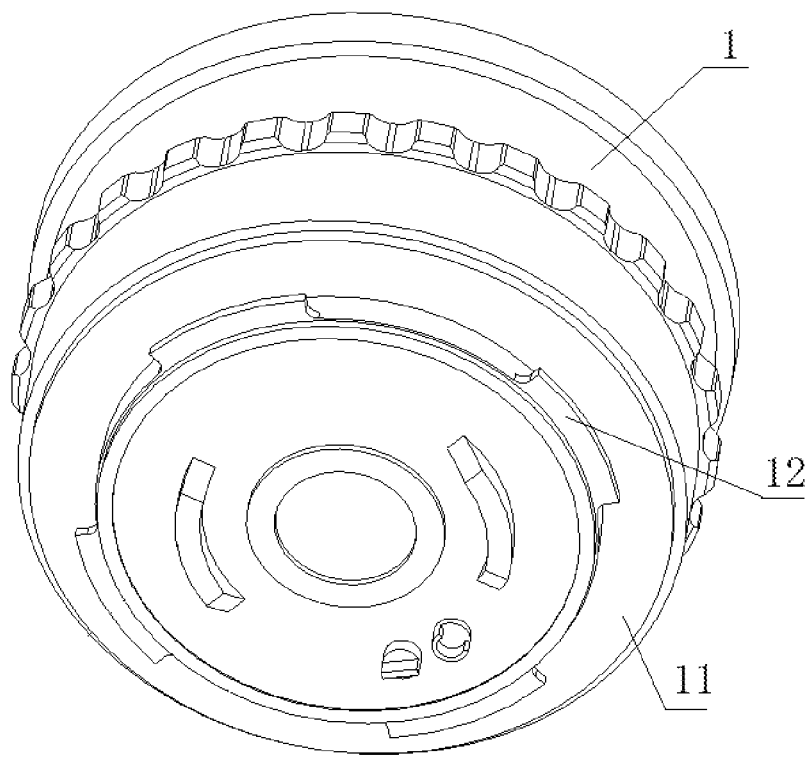
FIG. 3 shows the structure of the adapter.

The present application provides a lens breech locking device, comprising a lens 1 and an adapter 2. As shown in FIG. 3, the part 12 on the existing lens 1 is assembled on the adapter 2, because of the friction between lens 1 and adapter 2, the part 12 on lens 1 will be thinned, so that there is a gap between lens 1 and adapter 2. This will loosen the gap between lens 1 and adapter 2, which will make the lens unable to focus and provide a clear image for the camera sensor.

Aiming at the problem that the existing lens is easy to loosen after being assembled into the adapter and used for a long time, the present application provides a vertical fork flange to the existing adapter 2 to control the position of the lens on the adapter/camera through the vertical fork flange, so as to reduce the impact of friction between the lens 1 and the adapter 2 due to the contact surface, thereby realizing the locking of the lens breech.

Figure 1:
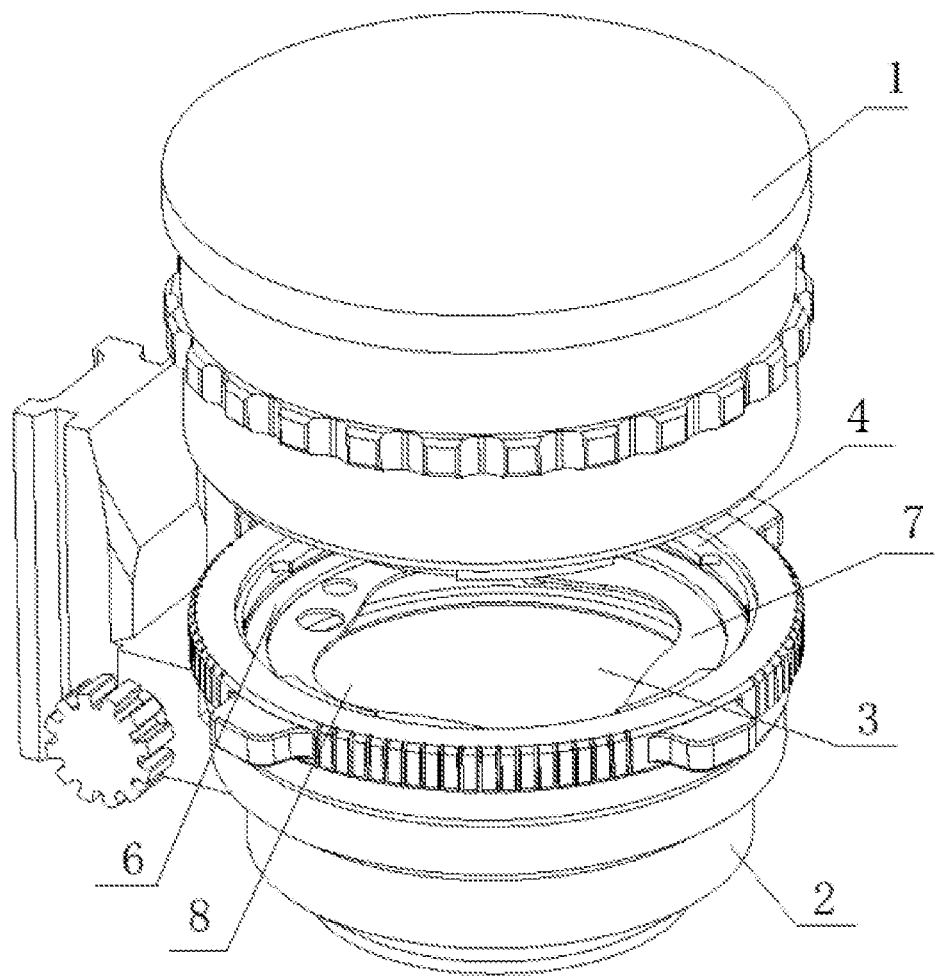
FIG. 1 is a schematic diagram of the structure of the lens breech locking device of the present application.
Figure 2:
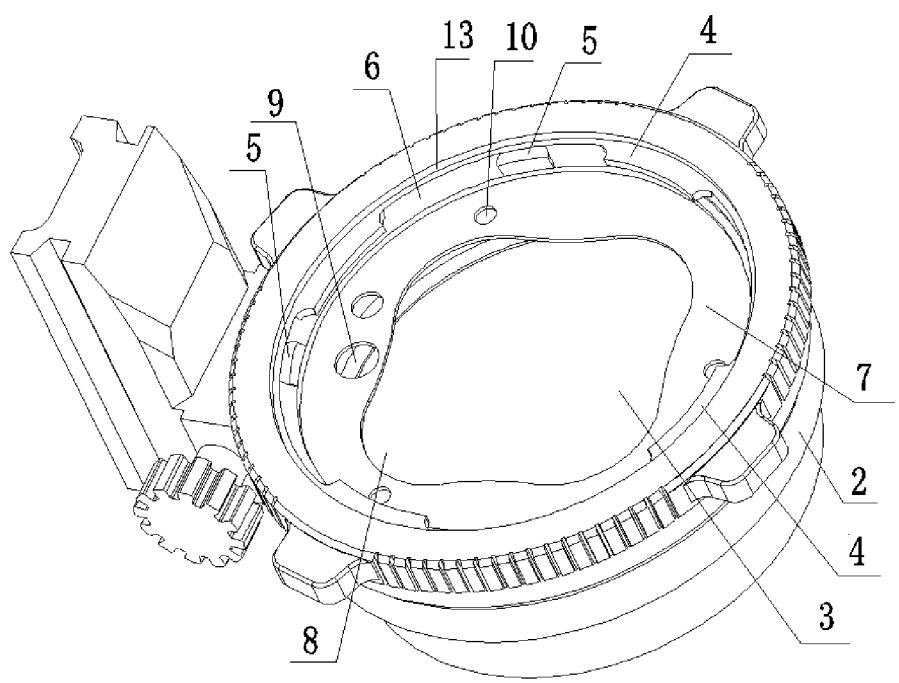
FIG. 2 is a schematic diagram of the matching connection between the lens and the adapter.

Specifically, as shown in FIGS. 1 and 2, the vertical fork flange 5 of the present application is located at the entrance of the lens placement slot 3 on the adapter 2, and a plurality of vertical fork flanges 5 with claws 4 are mounted in the lens placement slot 3 for adjusting the position of the lens 1 on the adapter 2. At the same time, in order to lock the lens 1 better, as shown in FIG. 2, the claw 4 is located between a chassis 13 of the vertical fork flange 5 and the bottom of the lens placement slot 3 (that is, the claw is arranged at the bottom of the lens placement slot 3).

In actual work, the vertical fork flange can be three to five (four is preferred). All the vertical fork flanges are arranged annularly as a whole, and the adjacent two vertical fork flanges are evenly spaced. In this way, the new design of four vertical fork flanges allows the lens to shelve the adapter/camera directly or indirectly.

In order to lock the position of the lens, a friction locking ring 6 under the claw 4 is also installed in the lens placement slot 3. The middle part of the friction locking ring 6 is connected with an adapter bracket 7 for locking adapter 2, and the middle part of the adapter bracket 7 is provided with a lens positioning hole 8 for placing the lens. In this way, the lens can be mounted on the adapter through the friction locking ring 6.

In practice, in order to further limit the lens, the adapter 2 bracket is also equipped with multiple lens positioning holes 9 and bolt mounting holes 10.

In order to better install the lens and adapter, the top of the lens 1 is also provided with a bottom plate 11 which is mounted on the vertical fork flange 5 chassis. The bottom plate 11 can be mounted on the vertical fork flange of the adapter/camera at the correct flange distance.

It should be understood that for ordinary technicians in the field, improvements or transformations may be made according to the above description, and all such improvements and transformations shall fall within the scope of protection of the claims appended to the present application.

What is claimed is:

1. A lens breech locking device comprising:
   a lens (1) and an adapter (2),
   a lens placement slot (3) for placing the lens (1) arranged on the adapter (2),
   wherein, a plurality of vertical fork flanges (5) with claws (4) are mounted in the lens placement slot (3) for adjusting a position of the lens (1) on the adapter (2), the claws (4) are located between a chassis (13) of the vertical fork flanges (5) and a bottom of the lens placement slot (3); and
   wherein the lens placement slot (3) is also provided with a friction locking ring (6) under the claws (4), an adapter bracket (7) for locking the adapter (2) is connected with a middle of the friction locking ring (6), and a lens positioning hole (8) for placing the lens is arranged in a middle of the adapter bracket (7).

2. The lens breech locking device according to claim 1, wherein there are four vertical fork flanges (5), and the four vertical fork flanges (5) are evenly spaced, and the four vertical fork flanges (5) are circularly arranged as a whole.

3. The lens breech locking device according to claim 1, wherein, the adapter bracket (7) is also provided with a plurality of lens positioning holes (9) and bolt mounting holes (10).

4. The lens breech locking device according to claim 2, wherein the adapter bracket (7) is also provided with a plurality of lens positioning holes (9) and bolt mounting holes (10).

5. The lens breech locking device according to claim 1, wherein a top of the lens (1) is also provided with a bottom plate (11) mounted on the chassis of the vertical fork flanges (5).

6. The lens breech locking device according to claim 2, wherein a top of the lens (1) is also provided with a bottom plate (11) mounted on the chassis of the vertical fork flanges (5).

7. The lens breech locking device according to claim 3, wherein a top of the lens (1) is also provided with a bottom plate (11) mounted on the chassis of the vertical fork flanges (5).

8. The lens breech locking device according to claim 4, wherein a top of the lens (1) is also provided with a bottom plate (11) mounted on the chassis of the vertical fork flanges (5).

* * * * *